United States Patent [19]

Yamaoka et al.

[11] Patent Number: 5,410,470
[45] Date of Patent: Apr. 25, 1995

[54] PROCESS CONTROL METHOD AND SYSTEM WITH EMPLOYMENT OF FUZZY INFERENCE

[75] Inventors: Hiromasa Yamaoka; Mitsuaki Kobayashi; Yasuhiro Tennichi, all of Hitachi; Tadayoshi Saito, Hitachiota, all of Japan

[73] Assignee: Hitachi, Ltd., Tokyo, Japan

[21] Appl. No.: 57,997

[22] Filed: May 5, 1993

[30] Foreign Application Priority Data

May 12, 1992 [JP] Japan .................... 4-118749

[51] Int. Cl.⁶ .......................................... G06F 15/46
[52] U.S. Cl. .................... 364/165; 364/164; 364/177; 395/900
[58] Field of Search ............ 364/148, 149-153, 364/157, 165, 160-162, 163, 164, 176, 177; 395/900, 903, 904, 906, 907

[56] References Cited

U.S. PATENT DOCUMENTS

| | | | |
|---|---|---|---|
| 4,830,508 | 5/1989 | Higuchi et al. | 395/900 |
| 4,864,490 | 9/1989 | Nomoto et al. | 364/157 |
| 5,043,862 | 8/1991 | Takahashi et al. | 364/162 |
| 5,047,701 | 10/1991 | Takarada | 395/900 |
| 5,245,528 | 9/1993 | Saito et al. | 395/900 |
| 5,251,124 | 10/1993 | Matsunaga | 364/177 |
| 5,272,621 | 12/1993 | Aoki | 364/177 |
| 5,305,230 | 4/1994 | Matsumoto et al. | 364/149 |
| 5,311,421 | 5/1994 | Nomura | 364/157 |

FOREIGN PATENT DOCUMENTS

| | | |
|---|---|---|
| 1-319619 | 12/1989 | Japan . |
| 2-150901 | 6/1990 | Japan ............... 364/177 |
| 3-12709 | 1/1991 | Japan . |
| 3-188504 | 8/1991 | Japan . |

OTHER PUBLICATIONS

"Fuzzy Control, System & Control", written by Yamazaki and Suzano, vol. 28, No. 7, 1984, pp. 442–446.

Primary Examiner—Roy N. Envall, Jr.
Assistant Examiner—Steven R. Garland
Attorney, Agent, or Firm—Kenyon & Kenyon

[57] ABSTRACT

A process control method and a process control apparatus using a fuzzy control with reducing rules and membership functions. The process control apparatus for determining a manipulating variable of a controlled object, includes an input/output unit for inputting a present value of a controlled variable and for outputting the determined manipulating variable, a predicting unit having a simulator of a controlled object, for calculating a control variable after a predetermined time has passed, assuming now that a present value of the manipulating variable is continued, and a fuzzy controlling unit for inferring a manipulating variable at a present time by inputting a deviation value between a preset set-point value and a predicted value. The simulator simulates the controlled object as dead time and a first order delay. Since only the predicted value of the controlled variable is employed as the input of the fuzzy control, fuzzy inference can be simplified and noise resistance can be improved.

18 Claims, 14 Drawing Sheets

PROCESS CONTROL METHOD AND SYSTEM WITH EMPLOYMENT OF FUZZY INFERENCE

CROSS-REFERENCE TO RELATED APPLICATIONS

This application relates to U.S. patent application Ser. No. 07/435,911, filed on Mar. 20, 1990, now U.S. Pat. No. 5,245,528, issued on Sep. 14, 1993, U.S. patent application Ser. No. 07/615,868, filed on Nov. 20, 1990, now U.S. Pat. No. 5,305,230, issued on Apr. 19, 1994, and U.S. patent application Ser. No. 07/625,096, filed on Dec. 10, 1991, now U.S. Pat. No. 5,311,421, issued on May 10, 1994 and are assigned to the present assignee. The disclosures of these applications are herein incorporated by reference.

BACKGROUND OF THE INVENTION

The present invention generally relates to a process control method and a process control apparatus. In particular, the present invention is directed to a process control method and a process control apparatus using fuzzy inference or fuzzy reasoning.

Conventionally, a PID control has been widely utilized as a process control. In accordance with this PID control, each of a controlled error or deviation between a set-point value, an integral value of this deviation, and a differential value of this deviation is summed with a control parameter in a weighting manner, and the summed value is used as a manipulating variable. The PID control has such an advantage that when a controlled object is approximated, or simulated to dead time and a first order delay, an experimental setting basis (for instance, Ziegler Nichols' critical sensitivity method) of the control parameter is given, and a relatively simple adjustment is achieved.

Very recently, to further improve control performance, such novel control method as a modern control theory and a fuzzy control have been practically utilized. In particular, this fuzzy control is one of the most practical control methods which have been utilized since 1980.

In the conventional fuzzy control applications to the fuzzy process control method, both of a controlled error and a variation contained in the controlled errors are employed as input values (see Japanese publication "FUZZY CONTROL, SYSTEM & CONTROL" written by Yamazaki and Suzano, Vol. 28, No. 7, 1984, pages 442 to 446). In case that there are 5 prepositions (positive/large, positive/medium, zero, negative/medium, negative/large) in the fuzzy inference, a total number of combinations made by fuzzy rules in which deviation and a change in this deviation are employed as input values, becomes 1 to 25. In this case, the number of fuzzy set, namely the quantity of membership function is such that the number of conditional parts is 10, and the number of conclusion parts is 5.

In the conventional fuzzy controls, since two input values of the controlled error and the variation thereof are entered, the total number of fuzzy rules with respect to two input values becomes 25, whereas that for one input values becomes only 5. As a result, a cumbersome system construction is required with respect to adjustments of membership functions, and also a lengthy calculation time is required for the conventional fuzzy control. Moreover, since the variation contained in the controlled errors is utilized as the input value, an adverse influence caused by noise is given to the conventional fuzzy control. When a controlled object contains dead time, control performance of the conventional fuzzy control is lowered.

SUMMARY OF THE INVENTION

The present invention has been made in an attempt to solve the above-explained problems, and therefore, provides a process control method with employment of fuzzy inference, capable of achieving high control precision in such a process containing dead time, and achieves a short calculation time required for a fuzzy control.

The present invention also provides a process control apparatus capable of considerably reducing man power required to build a process control system by way of a fuzzy inferring means which requires only small numbers of fuzzy rules and membership functions, and also capable of being easily adjusted in the actual field.

In accordance with one embodiment of the present invention, a process control method for controlling a controlled object in such a manner that a deviation value between a set point value and an output of the controlled object is to be reduced, comprises predicting an output of the controlled object indicative of a controlled variable after a predetermined time has passed, assuming now that an input of the controlled object indicative of a manipulating variable continues a present value; and obtaining a deviation between a predicted value of said controlled variable and said set point value to determine a manipulating variable at the present time by way of fuzzy inference. A mode (simulator) of the controlled object is defined by simulating the controlled object with a first order delay or the like.

According to another embodiment of the present invention, a process control apparatus for determining a manipulating variable of a control effector for a controlled object, comprises a simulator for simulating the controlled object;

predicting means for obtaining a controlled variable after a predetermined time has passed, assuming now that a present value of the manipulating variable is continued; and fuzzy control means for inferring to a manipulating variable at the present time by inputting a deviation value between a set point value and the predicted value of said predicting means, wherein the output of the fuzzy controlling means is used as an input to said input-/output means. The simulator is defined by approximately the controlled object to a first order delay, or the like. If this simulation contains dead time, the above-described predetermined time for setting a span between the present time and the prediction time, may be set to such a value obtained by multiplying the dead time by an integer.

According to the above-explained aspect, the controlled variable (output of controlled object) after a predetermined time has passed, assuming now that the manipulating variable at the present time is continued, may be predicted, and the manipulating variable at the present time may be determined by applying one input corresponding to the deviation between the set-point value and the predicted value to the fuzzy inference means. Since this deviation value contains not only the difference between the set-point value and the present value, but also the predicted variation in the process, the precision of the fuzzy inference can be maintained even with one input value. As a consequence, the very simple fuzzy calculation can be done and an easy adjustment for building the process system can be achieved.

Further, according to another embodiment of the present invention, the well known simulation models such as the first order delay and the dead time can be utilized. The process control of the present invention may be widely applied to, for example, a fluid surface control, a flow rate control, and a temperature control. When the dead time is involved in the simulation model, the fuzzy control precision may also be improved.

DESCRIPTION OF THE PREFERRED EMBODIMENTS

Referring now to the accompanying drawings, an embodiment of the present invention will be explained.

Figure 1:
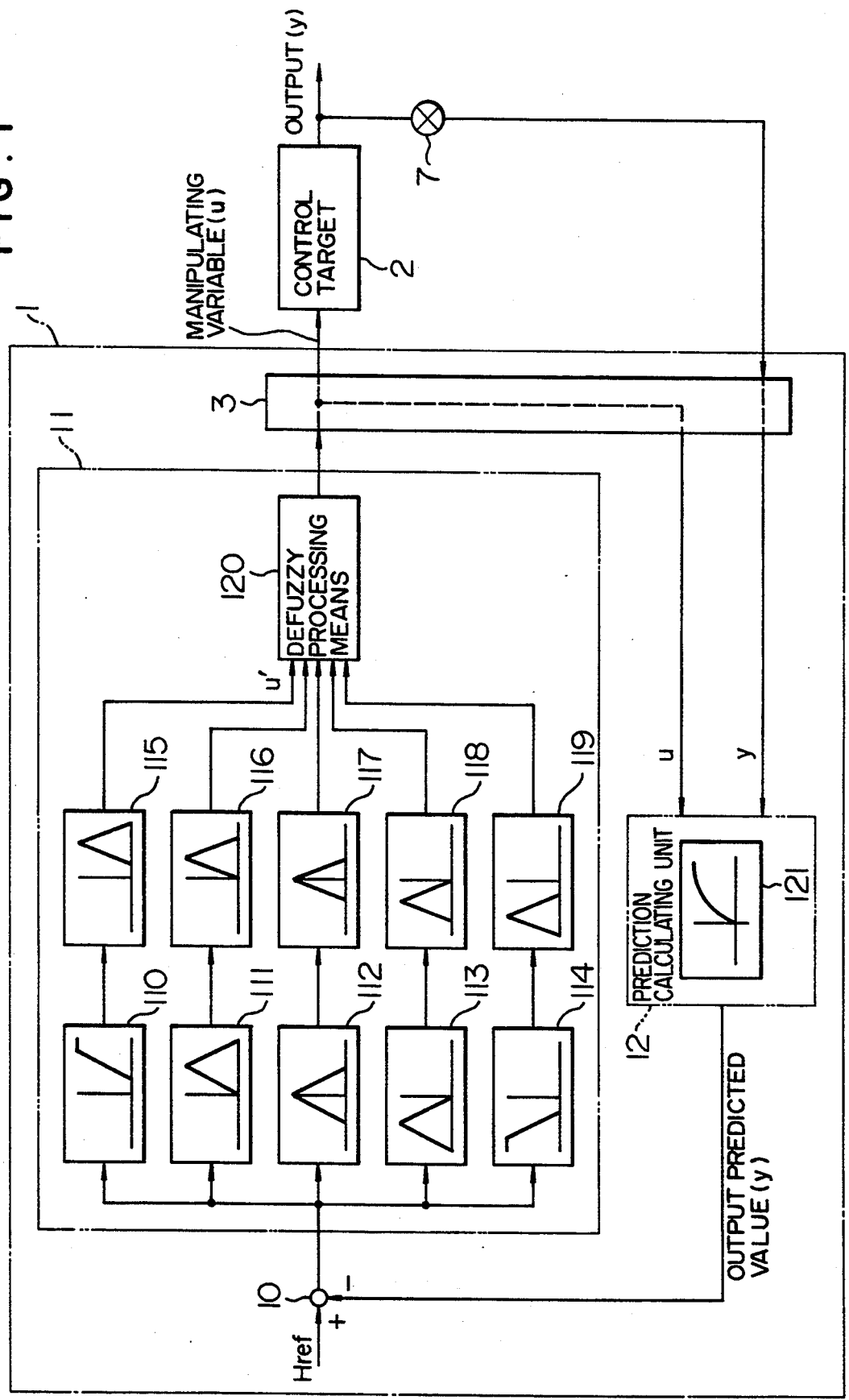
FIG. 1 is a schematic functional block diagram of a control apparatus according to a first embodiment of the present invention.

FIG. 1 functionally shows a control block diagram of a process control apparatus according to the present invention. The process control apparatus is arranged by such a computing system constructed of a central processing apparatus (CPU), a memory apparatus, and an input/output apparatus (which are not shown). When a set point value is set, the process control apparatus is operated in such a manner that an output from a controlled object 2 is approximated to this set point value. The process control apparatus includes a deviation value calculating means 10, a fuzzy controlling means (fuzzy reasoning unit) 11, and a prediction value calculating means 12.

The deviation value calculating means 10 calculates a deviation value between the preset set point value "Href" and the output value of the prediction value calculating means 12, and then supplies this deviation value to the fuzzy controlling means 11 as an input value.

The fuzzy controlling means 11 is arranged by a fuzzy rule group such as "if an input value becomes positive and great, then an output value is greatly increased", membership function groups 110 to 114 of rule condition parts for evaluating the input value at a grade, namely a satisfaction degree; membership function groups 115 to 119 of rule conclusion parts for evaluating the output value at a grade; and a defuzzy processing means 120 for quantifying an evaluated value by the conclusion parts of the membership functions by way of a gravity calculation. These fuzzy rule groups and membership function groups are stored in the storage apparatus and then are read out to the CPU, so that fuzzy inference is executed. An output from the unfuzzy processing means 120 is made as a manipulating variable (u) by the input/output apparatus 3, and supplied to a control effective device (not shown) of the controlled object.

The prediction value calculating means 12 includes therein an approximation model 121 of the controlled object, and predicts a future controlled object output (y′) based upon a control target output (y) and a manipulating variable (u) measured by a sensor 7 at the present time. A deviation between this predicted value (y′) and the set point value (Href) is input to the fuzzy controlling means 11 to control the controlled object 2.

Figure 2:
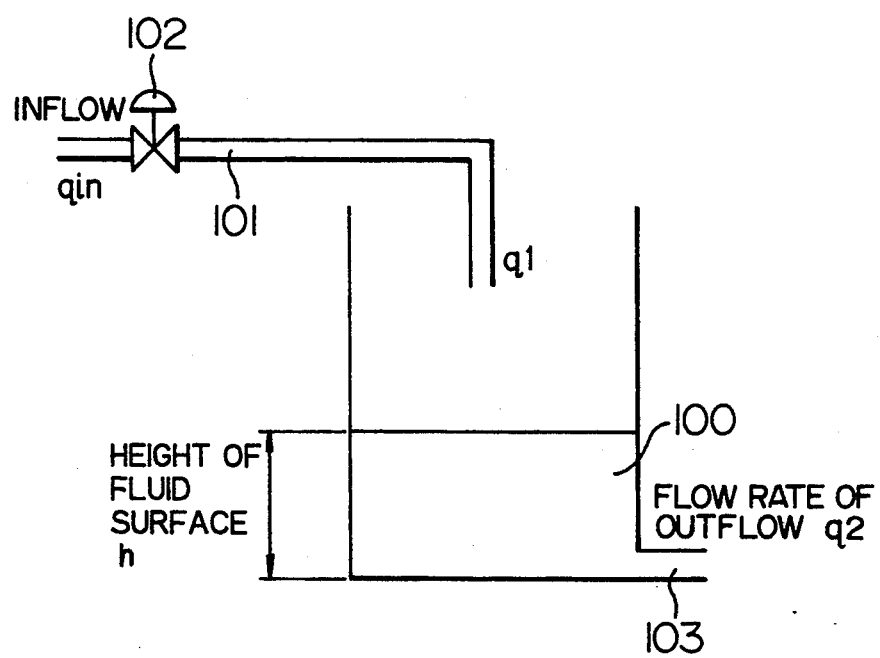
FIG. 2 schematically shows a conceptional idea for explaining a model of a tank fluid surface control.

Although the following description will now be made of an application example of a fluid surface control of a tank as a concrete process of the present invention, the present invention is not limited thereto, but may be applied to other controlled objects. FIG. 2 represents a control model of a tank fluid surface corresponding to a controlled object. This control model is arranged by a tank 100, an inflow pipe 101, a control valve 102, and an outflow pipe 103.

A characteristic of this tank fluid surface control model may be approximated by Equations (1) to (3) of a function as time "t".

$$q1(t) = qin(t-L) \quad \ldots (1)$$

$$q2(t) = h(t)/R \quad \ldots (2)$$

$$dh(t)/dt = (q1(t) - q2(t))/A \quad \ldots (3)$$

where the symbol "qin(t)" indicates a flow rate of an inlet of the inflow pipe 101 (namely, manipulating variable by the control valve 102), and the symbol "q1(t)" denotes a flow rate of an outlet of the inflow pipe 101. This flow rate "q1(t)" corresponds to such a flow rate defined by delaying the flow rate "qin(t)" by dead time "L". The symbol "q2(t)" indicates a flow rate of the outflow pipe 103 (namely, flow rate at an outlet of the tank), and is proportional to a height "h(t)" of the tank fluid surface. The symbol "R" denotes an outflow resistance. A time differential of the height h(t) of the fluid surface "dh(t)/dt" is proportional to a difference between the inflow rate "q1(t)" of the tank and the outflow rate "q2(t)". The symbol "A" represents a cross section of the tank.

When the Equations (1) to (3) are Laplace-transformed, these Equations become an Equation (4) as a function of Laplace operator "s".

$$H(s) = Qin(s) \cdot R \cdot exp(-Ls)/(I+RAs) \quad (4)$$

where the symbol "H(s)" indicates a height of fluid surface h(t), and symbol "Qin(s)" denotes a Laplace transform of the manipulating variable "qin(t)" by the control valve. It can be understood from the above-described Equation (4) that the present process is constructed of dead time "L" and a first order lag of a time constant "RA".

Figure 3:
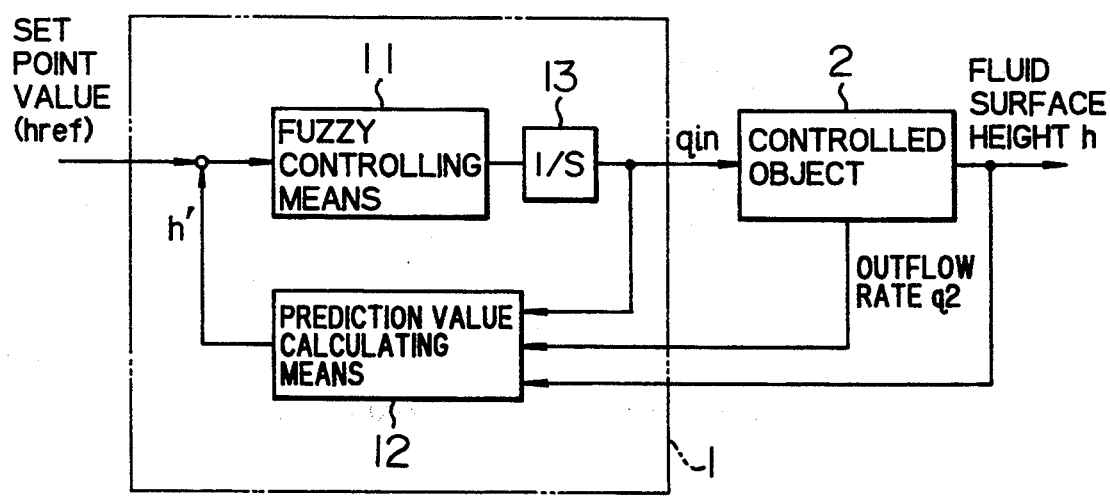
FIG. 3 schematically shows a control block diagram of the tank fluid surface control.

FIG. 3 schematically shows a control block diagram of a tank fluid surface control according to the first embodiment of the present invention. The control apparatus 1 includes the fuzzy controlling means 11 including a fuzzy inference engine, the prediction value calculating means 12, and an integrator 13. The integrating means 13 is necessarily required in a case that the output of the fuzzy controlling means corresponds to a velocity type output, but is not required in a case that the output of this fuzzy controlling means corresponds to a position type output.

The prediction value calculating means 12 predicts an output h' of a controlled object after a constant time has passed by employing the approximation models Equations (2) and (3) of the controlled object based on "qin" corresponding to the manipulating variable of the fuzzy controlling means 11, the output of the controlled object (height of fluid surface) corresponding to the controlled variable, and the outflow rate q2 of the tank. The fuzzy controlling means 11 calculates a manipulating variable at a present time instant, namely an input "qin(t0)" of the controlled object based upon the above-explained prediction output h' and the controlled set point value "Href".

On the other hand, since the Equation (1) merely indicates an item representative of the dead time, this equation is not always used in the prediction calculation. In other words, the calculation to obtain the prediction values of the control models represented by the Equations (1) to (3) after time "t1" has passed, implies the prediction values of the control models indicated by the Equations (2) and (3) after time (t1-L) has passed. As a consequence, for the sake of simple explanation, assuming now that the time t1−L=T, the following description will be made by the Equations (2) and (3).

An operation of the prediction value calculating means 12 will now be explained more in detail. Assuming now that a tank inflow rate "q1(t0)" at the present time is continued by the Equations (2) and (3), the relationship of the predicted height of the fluid surface H(t) is expressed by the following Equation (5). An Equation (6) is used to calculate an outflow resistance "R" based on a tank fluid surface height "h(t0)" and a tank outflow rate "q2t0" at the present time. Then, if the outflow resistance "R" is constant, then this calculation is required.

$$dH(t)/dt = -H(t)/A/R + q1(t0)/A \quad \ldots (5)$$

$$R = h(t0)/q2(t0) \quad \ldots (6)$$

when an initial value of H(t) in the above Equation (5) is "H(t0)", the present value h(t0) is substituted for the Equation (5), and the calculation is performed in the on-line mode, a height of a tank fluid surface "H(t0+t)" after a certain time "T" has passed may be predicted. Then, a difference between this height "H(t0+T)" and the controlled set point value "Href" is used as an input to the fuzzy (inferring) controlling means 11.

Figure 4:
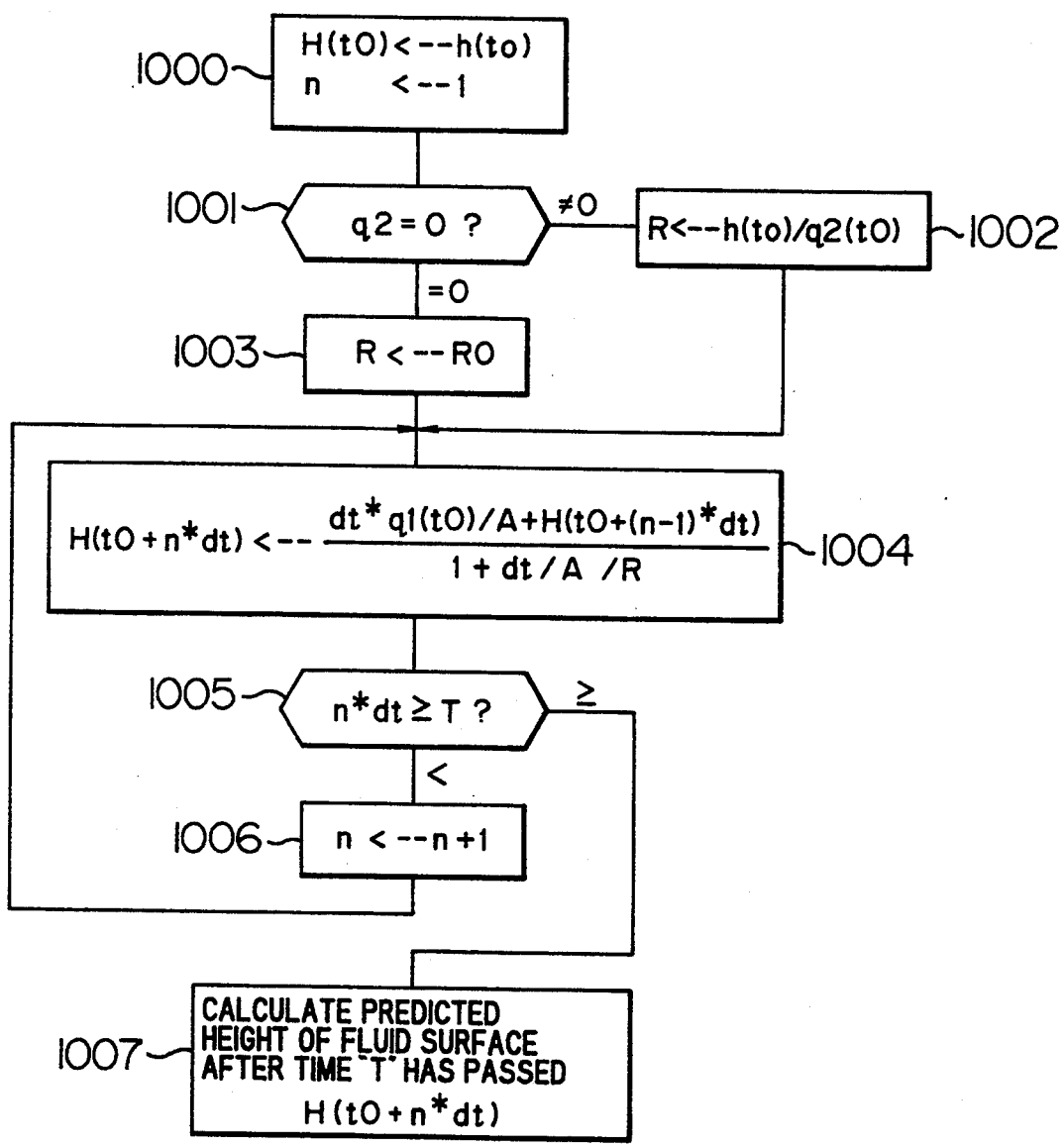
FIG. 4 is a flow chart for representing a process step of a prediction calculation with respect to the tank fluid surface control.

FIG. 4 is a flow chart for explaining the simplest calculation effected by utilizing a digital computer. In FIG. 4, a step 1000 is a step initializing the initial value H(t0) of the height "H" of the predicted fluid surface and the count value of the counter "n". At a step 1001, a check is performed as to whether or not an outflow rate "q2" of the tank is equal to zero. If this tank outflow rate "q2" is not equal to zero, then an outflow resistance "R" is calculated from the fluid surface height "h" and the outflow rate "q2". If the outflow rate "q2" is equal to zero, then a prediction value "RO" of the outflow resistance which has been previously measured or calculated, is used as the outflow resistance "R" at a step 1003. At a step 1004, the Equation (5) is expressed by a difference equation, where symbol "dt" indicates differential time. At a step 1005, another check is performed as to whether or not the calculation up to time "T" could be completed. If not yet accomplished, then the count value of the counter "n" is increased by 1 at a step 1006, and the process operation is returned to the previous step 1004. To the contrary, if the calculation up to the time "T" has been accomplished, then the prediction calculation is ended. At a step 1007, a calculation for the predicted height of the fluid surface after the time "T" has elapsed, is completed.

In this case, the time "T" may be applied as a value obtained by multiplying the dead time for the controlled object by a predetermined value, otherwise may be directly applied as a unit of time (for instance, 5 seconds). In the former case, the time "T" may be applied to such a condition that the membership function is tuned by the simulation model. In the latter case, the time "T" may be applied to such a state that the membership function is tuned by employing the real plant.

Next, a description will be made of an operation of the fuzzy controlling means 11. It should be understood that the below-mentioned 5 sorts of fuzzy rules will be used in this embodiment. Also, the number of fuzzy rules may be increased and/or decreased, depending upon prepositions (positive/large, positive/medium etc.) of fuzzy inference or fuzzy reasoning.

(Rule 1): If a predicted deviation after time "T" becomes positive and large (PB), then an inflow rate is further increased by a great value (B0).

(Rule 2): If a predicted deviation after time "T" becomes positive and medium (PM), then an inflow rate is further increased by a medium value (M0).

(Rule 3): If a predicted deviation after time "T" becomes zero (Z0), then an inflow rate is maintained at the present value (ZB).

(Rule 4): If a predicted deviation after time "T" becomes negative and medium (NM), then an inflow rate is further decreased by a medium value (MC).

(Rule 5): If a predicted deviation after time "T" becomes negative and large (NB), then an inflow rate is further decreased by a large value (BC).

Figure 5:
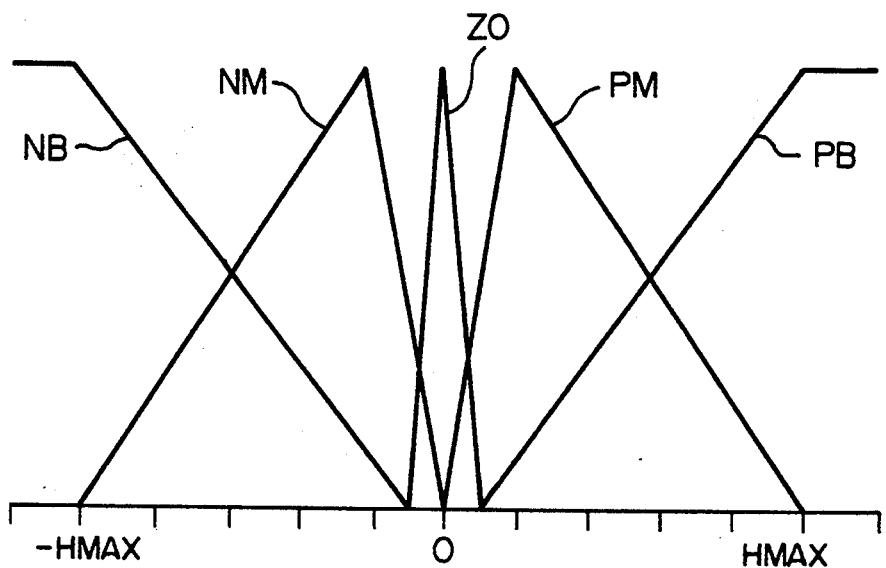
FIG. 5 schematically indicates a membership function of a condition part of a fuzzy rule.

FIG. 5 illustrates a membership function group corresponding to the conditional parts of the above-described rules. For instance, in case that the controlled object of this embodiment is undergone fuzzy-inference based upon the deviation between the conventional set point value and the controlled variable, and a variation of this deviation, the total number of rule becomes 21 which is 4 times higher than that of the rules, and also the membership functions of the conditional parts become twice, as shown in a table 1.

TABLE 1

(Rule 1) If a deviation becomes positive/large and a change in deviation becomes positive/large, then an inflow rate is further increased.

(Rule 2) If a deviation becomes positive/large and a change in deviation becomes positive/medium, then an inflow rate is further increased.

(Rule 3) If a deviation becomes positive/large and a change in deviation becomes zero, then an inflow rate is further increased.

(Rule 4) If a deviation becomes positive/large and a change in deviation becomes negative/medium, then an inflow rate is further increased by a medium value.

(Rule 5) If a deviation becomes positive/large and a change in deviation becomes negative/large, then an inflow rate is presently maintained.

(Rule 6) If a deviation becomes positive/medium and a change in deviation becomes positive/large, then an inflow rate is further increased.

(Rule 7) If a deviation becomes positive/medium and a change in deviation becomes positive/medium, then an inflow rate is further increased.

(Rule 8) If a deviation becomes positive/medium and a change in deviation becomes zero, then an inflow rate is further increased by a medium value.

(Rule 9) If a deviation becomes positive/medium and a change in deviation becomes negative/medium, then an inflow rate is presently maintained.

(Rule 10) If a deviation becomes positive/medium and a change in deviation becomes negative/large, then an inflow rate is presently maintained.

(Rule 11) If a deviation becomes zero and a change in deviation becomes positive/large, then an inflow rate is further increased by a medium value.

(Rule 12) If a deviation becomes zero and a change in deviation becomes positive/medium, then an inflow rate is further increased by a medium value.

(Rule 13) If a deviation becomes zero and a change in deviation becomes zero, then an inflow rate is presently maintained.

(Rule 14) If a deviation becomes zero and a change in deviation becomes negative/medium, then an inflow rate is further decreased by a medium value.

(Rule 15) If a deviation becomes zero and a change in deviation becomes negative/large, then an inflow rate is further decreased by a medium value.

(Rule 16) If a deviation becomes negative/medium and a change in deviation becomes positive/large, then an inflow rate is presently maintained.

(Rule 17) If a deviation becomes negative/medium and a change in deviation becomes positive/medium, then an inflow rate is presently maintained.

(Rule 18) If a deviation becomes negative/medium and a change in deviation becomes zero, then an inflow rate is further decreased by a medium value.

(Rule 19) If a deviation becomes negative/medium and then a change in deviation becomes negative/medium, then an inflow rate is further decreased.

(Rule 20) If a deviation becomes negative/medium and then a change in deviation becomes negative/large, then an inflow rate is further decreased.

(Rule 21) If a deviation becomes negative/large and then a change in deviation becomes positive/large, then an inflow rate is presently maintained.

In FIG. 5, an ordinate denotes a grade of an input value (0 to 1.0 in this embodiment), whereas an abscissa shows an input value (a deviation value in a fluid surface height). The respective labels PB, PM, ZO, NM, and NB indicates membership functions when fuzzy sets for the input values (deviations) are positive/large, positive/medium, zero, negative/medium and negative/large. An example of FIG. 5 defines that a parameter of the tank is given as follows:

cross section A = 10 (m$^2$)

outflow resistance R = 1 (sec/m$^2$)

maximum height of liquid surface Hmax = 20 (m).

In FIG. 5, it should be noted that the reason why the width of the abscissa of Z0 is narrow is to reduce a steady-state deviation as small as possible. However, the present invention is not limited to this pattern.

Figure 6:
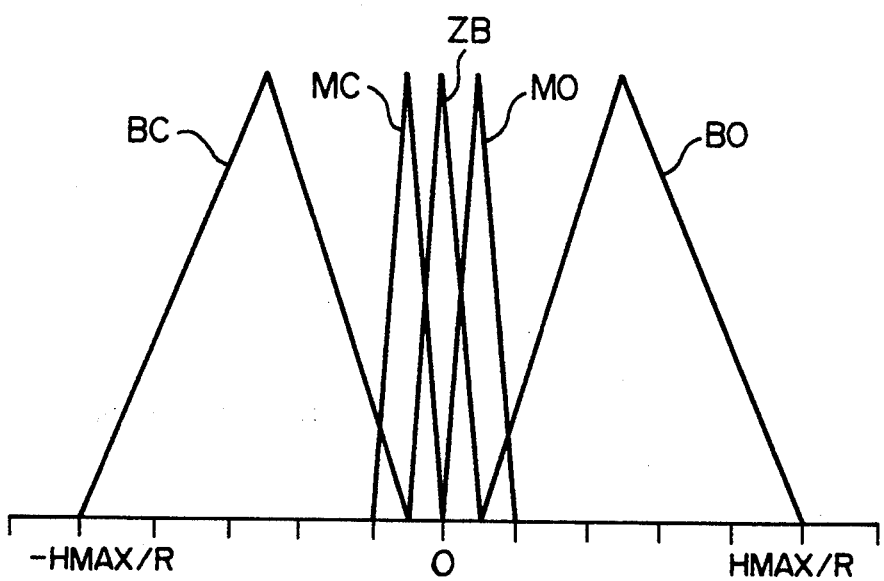
FIG. 6 schematically denotes a membership function of a conclusion part of a fuzzy rule.

A membership function group corresponding to the conclusion parts of the above-explained fuzzy rules is represented in FIG. 6. In this drawing, an ordinate shows a grade corresponding to the membership function of the conditional parts of the above-explained fuzzy rules, and an abscissa denotes a manipulating variable (i.e., inflow rate in this embodiment). Symbols BO, MO, ZB, MC, and BC represent such membership functions that an inflow rate is further increased by a large value an inflow rate is further increased by a medium value, an inflow rate is maintained at a present value, an inflow rate is further decreased by a medium value, and an inflow rate is further decreased by a large value, respectively. In this drawing, the reason why the abscissa widths of the membership functions BC and BO are greater than those of the remaining membership functions, is such that when a deviation value becomes large, a manipulation amount of the inflow rate control valve is set large, and thus a quick response to the large variation of the set point value can be achieved. The present invention is not limited to this pattern.

In this embodiment, the Min-Max gravity method well known as the Mandani teaching method has been employed as the fuzzy inference method. This Min-Max gravity method will now be explained. It should be noted that since the present invention can be achieved irrelevant to the sort of inference, the present invention may be realized by way of other methods.

In FIG. 1, the input value (deviation value) of the fuzzy inferring means 11 is input into calculating units 110 to 114 of the conditional parts of the fuzzy rules. The respective calculating units own such membership functions that the deviations are positive/large, positive/medium, zero, negative/medium, and negative/large, and output grades corresponding to the input values. Calculating units 115 to 119 of the conclusion parts corresponding to the conditional parts own such membership functions that a flow rate is further increased by a large value, a flow rate is further increased by a medium value, a flow rate is maintained at a present value, a flow rate is further decreased by a medium value, and a flow rate is further decreased by a large value. The respective calculating units of the conclusion parts output such functions obtained by multiplying the respective membership functions by the grades of the conditional parts, as output membership functions, to the unfuzzy processing unit 120. The unfuzzy processing unit 120 calculates a real gravity of the output membership functions outputted from the calculating unit 115 to 119, thereby obtaining a manipulating variable (a).

Figure 7:
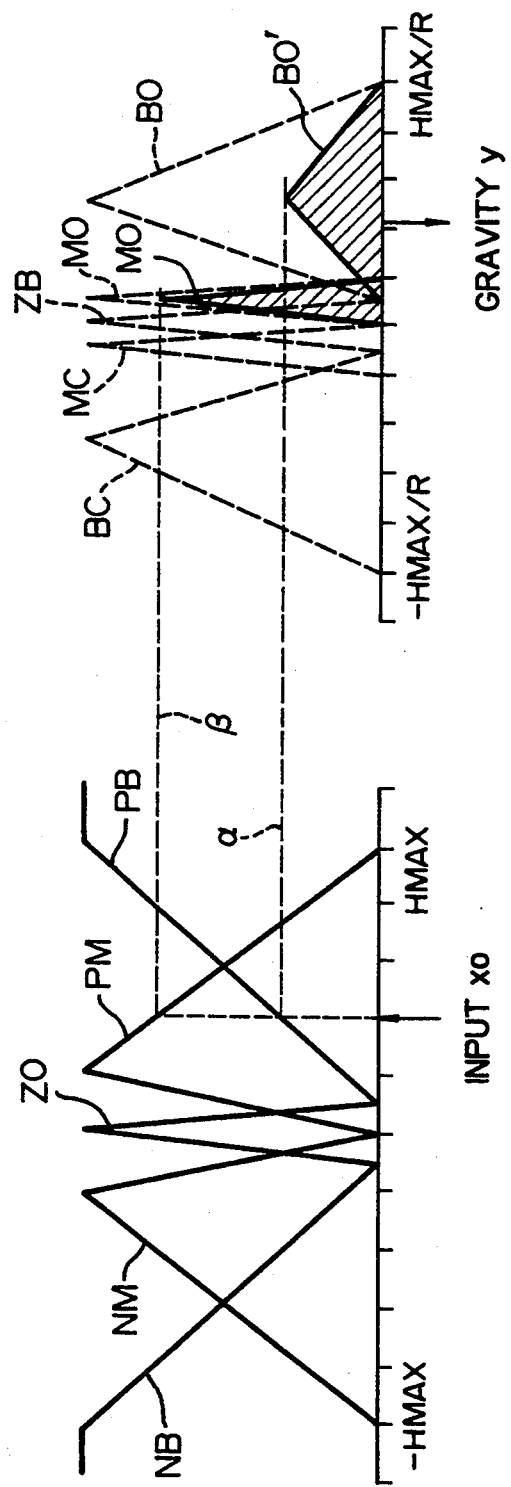
FIG. 7 is a schematic diagram for explaining a method of fuzzy inference by way of the membership function.
Figure 8:
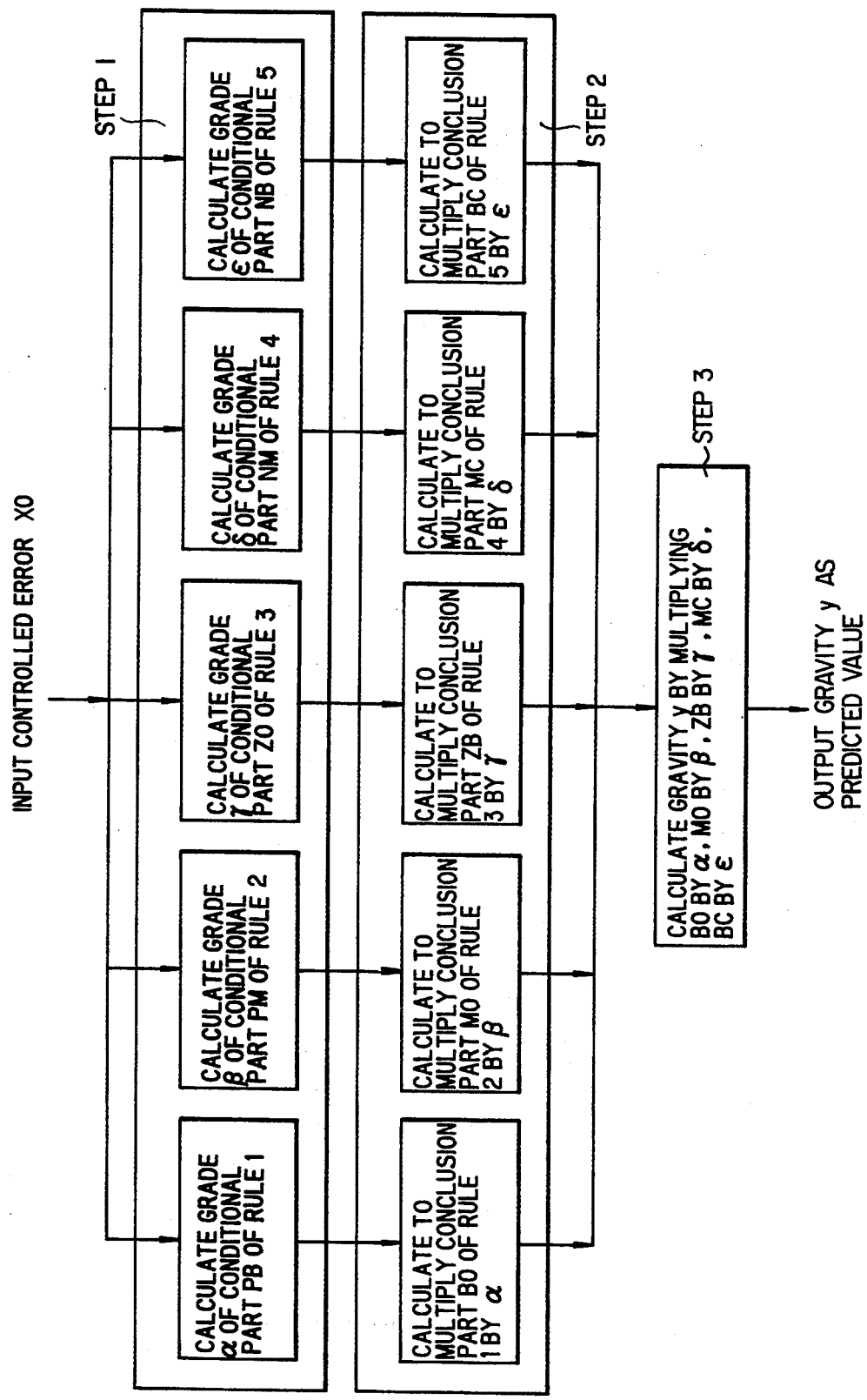
FIG. 8 is a flow chart for representing a process step of the fuzzy inference.

FIGS. 7 and 8 concretely represent the above-described fuzzy inference. FIG. 7 conceptually represents a fuzzy inferring method in this embodiment, the left portion of which is the membership function of the conditional part corresponding to FIG. 5, and the right portion of which is the membership function of the conclusion part corresponding to FIG. 6. Assuming now that "XO" is provided as the input value, certainty such that XO is PB (positive/large), is equal to "$\alpha$ (alpha)", and certainty such that XO is PM (positive/medium), is equal to "$\beta$ (beta)". On the other hand, such a fuzzy rule that both of PB and PM appear in the conditional part, is the rule 1 and the rule 2. The conclusion part of the rule 1 is BO (namely, inflow rate is further increased by a large value), and the conclusion part of the rule 2 is MO (namely, inflow rate is further increased by a medium value). Values obtained by multiplying the respective membership functions of the conclusion parts by "$\alpha$" and "$\beta$", are inclined portions of this figure (MO', BO'). Gravity of this inclined portion is calculated to obtain an output "y" as a value on an abscissa of this gravity.

FIG. 8 shows a process flow of the fuzzy inference according to this embodiment. At a step 1 of this flow, calculations are made of grades $\alpha$, $\beta$, y, $\delta$ and $\epsilon$ with respect to the membership functions of the conditional parts of the respective fuzzy rules for the controlled error "XO". At a step 2, the membership functions of the conclusion parts of the fuzzy rules are multiplied by the grades obtained at the step 1 so as to obtain output membership functions. At a further step 3, the output membership functions calculated at the step 2 are AND-gated with each other in order to obtain gravity thereof.

As previously described, since only the prediction value of the controlled error is input as the input value to perform the fuzzy inference according to this embodiment, the number of inference rules and of membership functions can be considerably reduced, and the fuzzy inference can be processed in real time, as compared with such a conventional fuzzy inference that both of the controlled error and the variation in the controlled errors are input. Furthermore, the fuzzy inferring means can be easily built. More specifically, the membership function may be readily tuned.

Figure 9:
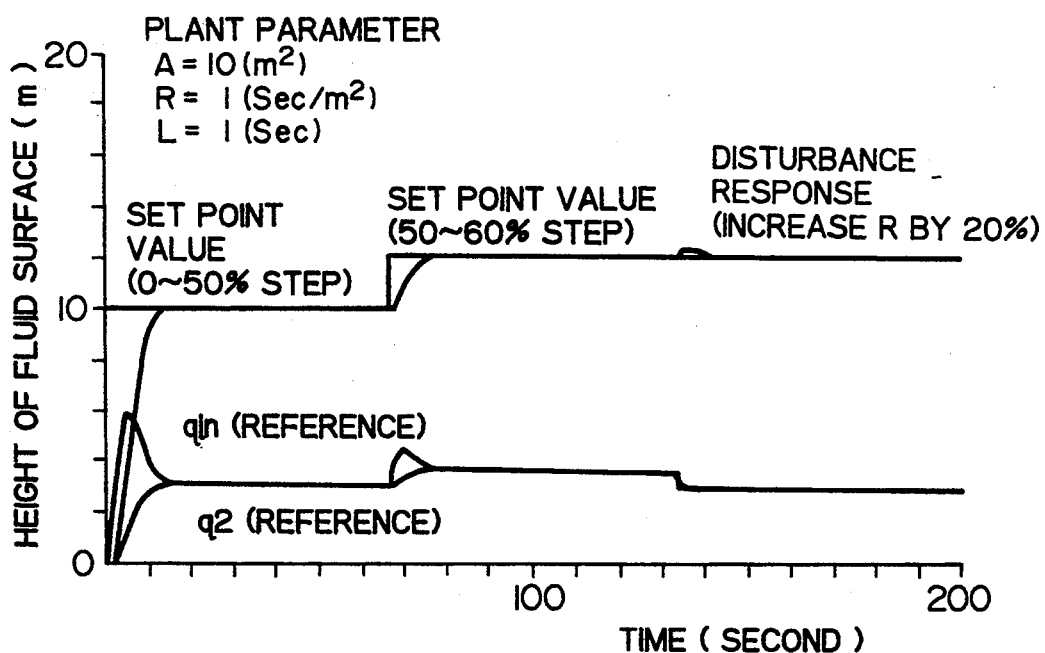
FIG. 9 is a characteristic diagram for indicating a control result obtained by the first embodiment.
Figure 10:
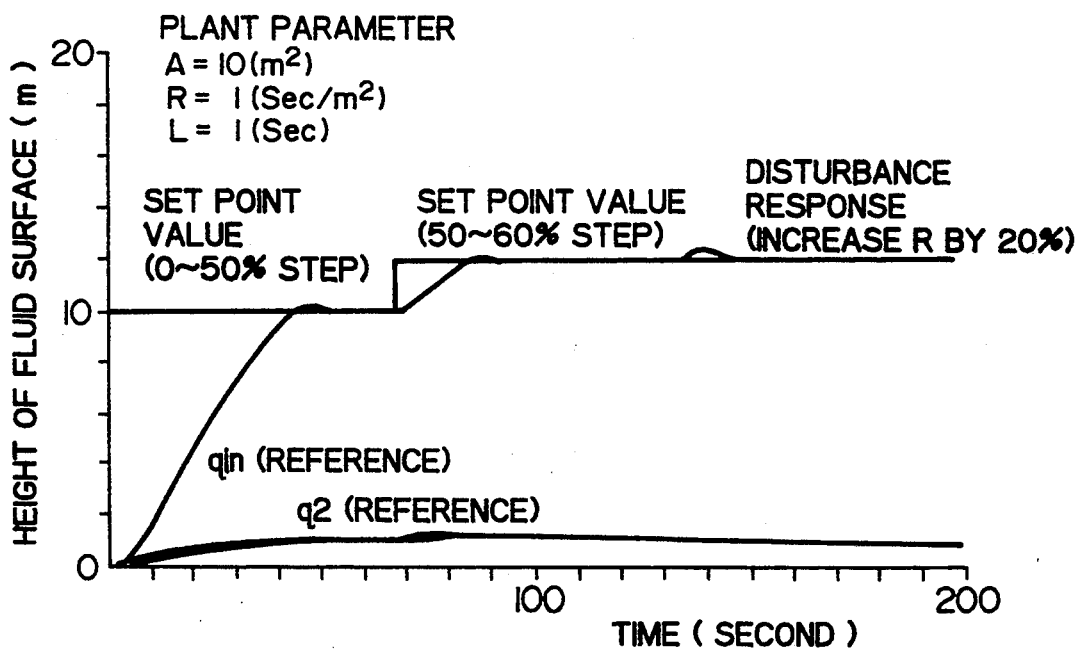
FIG. 10 is a characteristic diagram with regard to the conventional fuzzy control.
Figure 11:
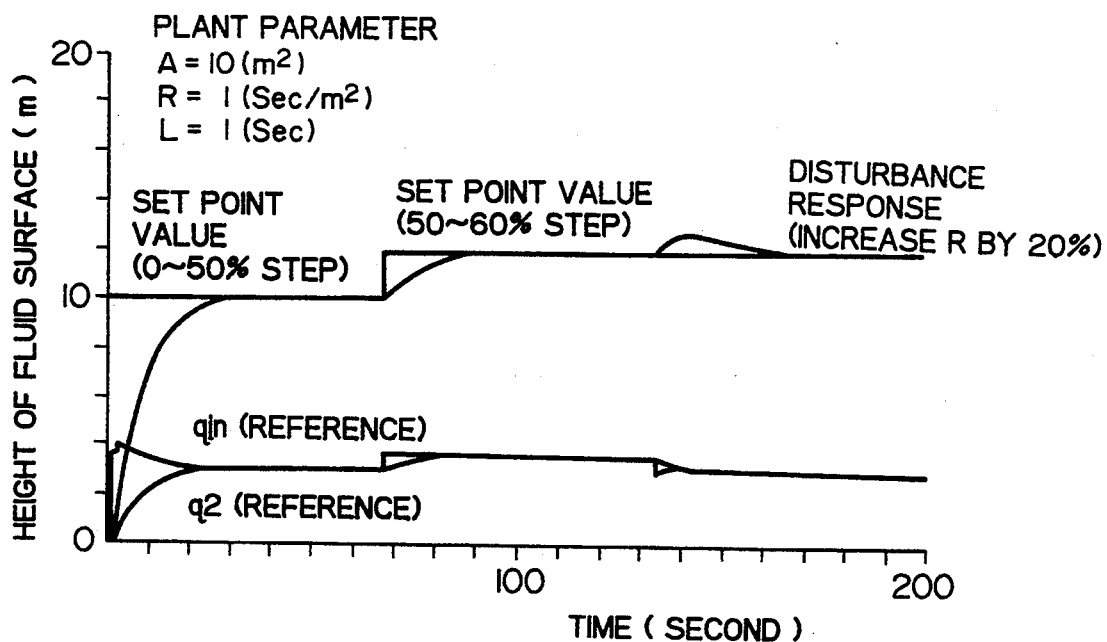
FIG. 11 is a characteristic diagram with regard to the conventional PI control.

Next, the control characteristic according to this embodiment will now be represented in FIGS. 9 to 14 in comparison with other control methods. First, FIGS. 9 to 11 show such cases with the following parameters of the controlled object:

cross section: A = 10 (m$^2$)

outflow resistance: R = 1 (sec/m$^2$)

inflow dead time: L = 1 (sec)

FIG. 9 indicates the control characteristic according to this embodiment. FIG. 10 shows the control characteristic according to the conventional fuzzy control such that both of a deviation and a change in the deviations are inputted to perform fuzzy inference, in which the fuzzy rules of the table 1 have been employed. FIG. 11 represents a control characteristic according to the conventional PI control.

Similarly, there are shown in FIGS. 12 to 15, control characteristics of the respective control methods with respect to such cases that characteristics of controlled objects are given as follows:

cross section: A = 10 (m$^2$)

outflow resistance: R = 1 (sec/m$^2$)

inflow dead time: L = 5 (sec)

Figure 12:
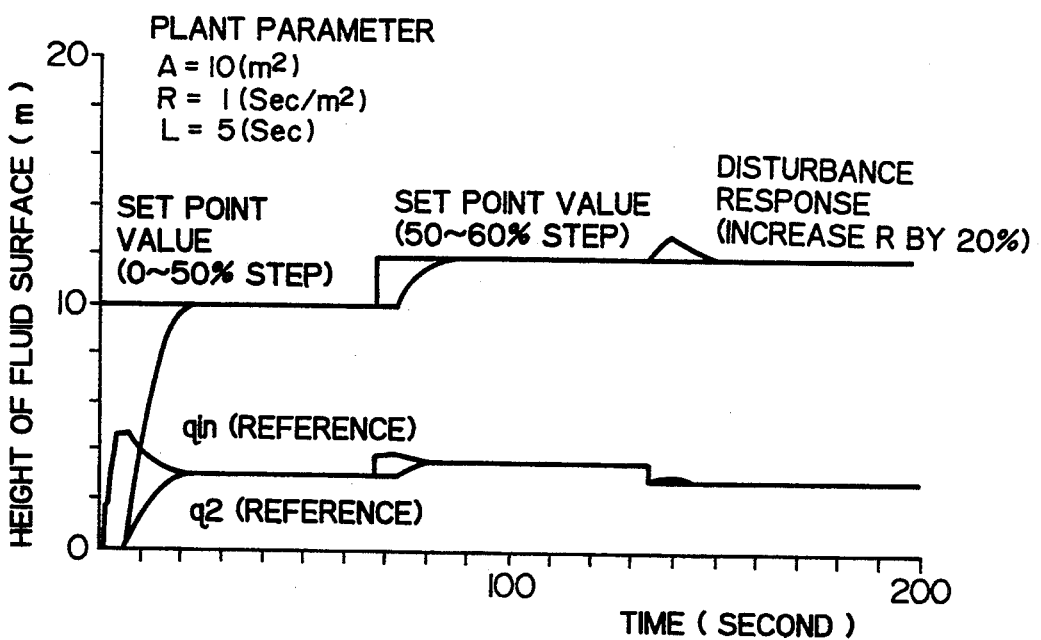
FIG. 12 is a characteristic diagram for showing a control result obtained by a second controlled object in accordance with the first embodiment.
Figure 13:
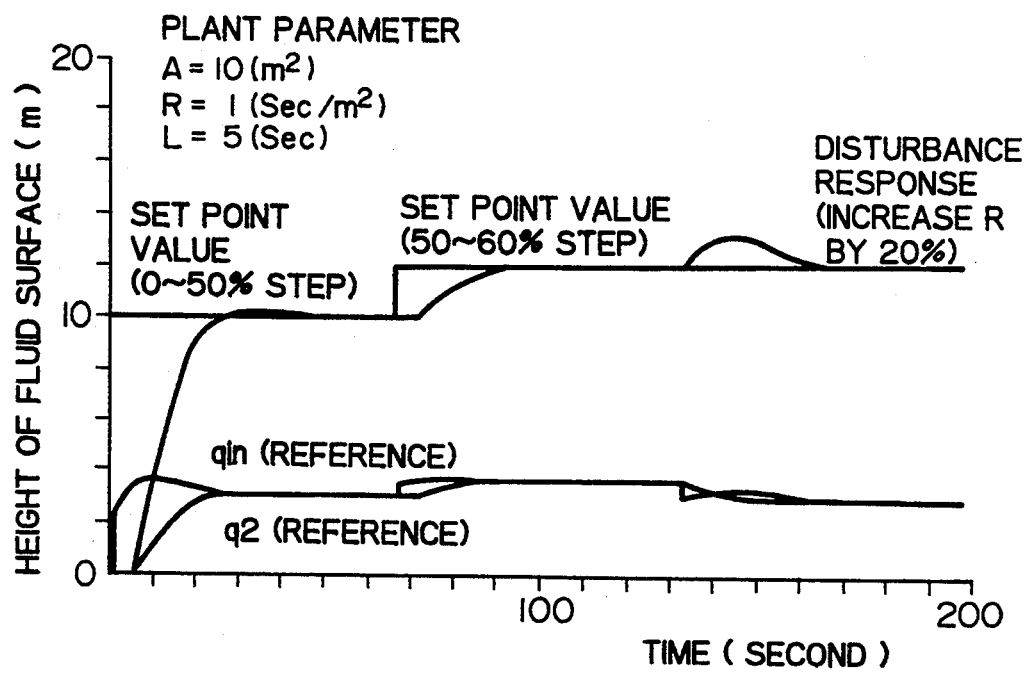
FIG. 13 is a characteristic diagram with regard to the second controlled object according to the conventional fuzzy control.
Figure 14:
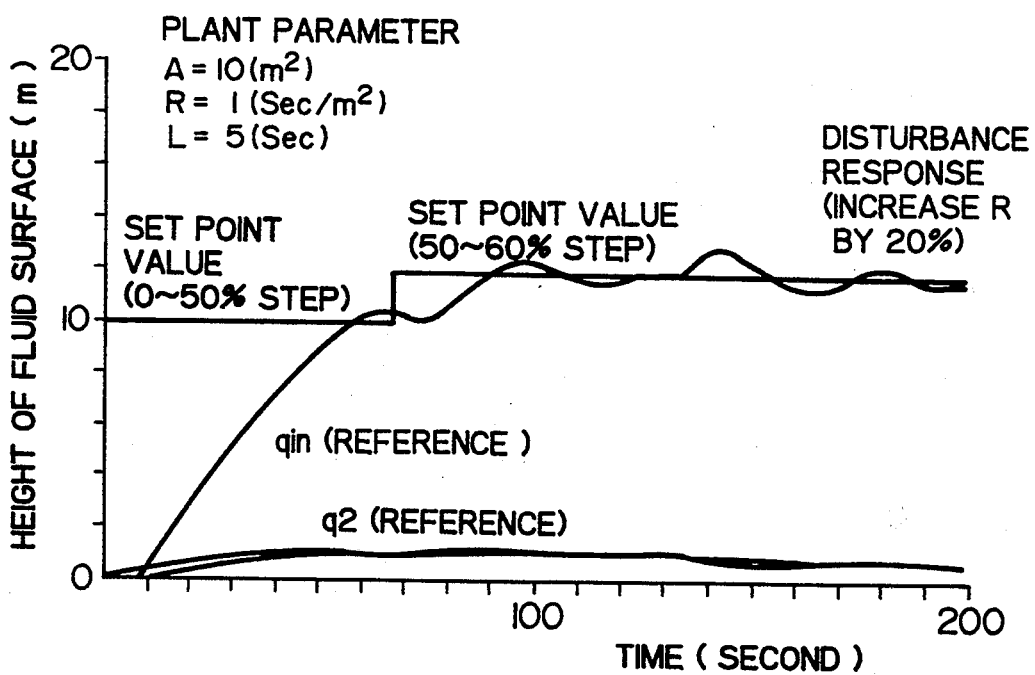
FIG. 14 is a characteristic diagram with reference to the second controlled object according to the conventional PI control.

FIG. 12 indicates a control characteristic according to this embodiment. FIG. 13 is a reference diagram for indicating the control characteristic according to the conventional fuzzy control. FIG. 14 is a reference diagram showing the control characteristic according to the conventional PI control.

FIGS. 9 to 14 illustrate output response in case when stepped set-point values from 0% to 50% are first added to the fluid surface height of 0 (200), thereafter stepped set-point values from 50% to 60% are added (201), and furthermore such a disturbance that the outflow resistance is varied by 20%. It should be noted that waveforms of the manipulating variable "qin" and the tank outflow rate "q2" are plotted in the respective drawings for reference purposes.

As apparent from the above-described examples, in accordance with the control characteristics of this embodiment, both of the following characteristic for the set-point value and the response characteristic for the disturbance can be improved, as compared with those of the conventional fuzzy control. In particular, when the dead time of the process becomes large (see FIGS. 12 to 14), there is a particular improvement in the control characteristic according to this embodiment, as compared with not only the conventional fuzzy control, but also the conventional PID control. That is, there is a limitation in the conventional fuzzy control and the PID control that the proportional gain is set large in order to mitigate adverse influences caused by the dead time of the controlled object. However, according to this embodiment, a gain margin is increased by predicting a future output of the controlled object.

Also, since the fuzzy inferring means is employed in the fuzzy control, the proportional gain can be made nonlinear, and the proportional gain can be changed in accordance with the deviation. As a consequence, since the gain can be reduced to some extent in order to suppress the overshoot amount in the large deviation region, and also the gain is increased as well as the process can be operated in a stable condition so as to increase the velocity to converge into the set-point value in the small deviation region, the following characteristic of the set-point value and furthermore the suppression characteristic with regard to disturbance can be improved.

Figure 15:
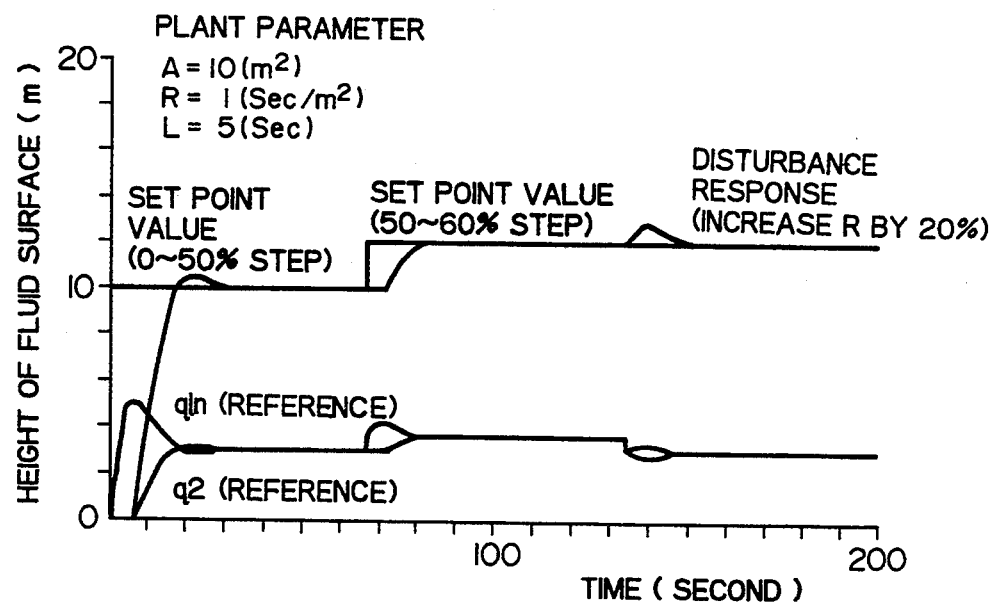
FIG. 15 is a characteristic diagram for representing a control result obtained by a third controlled object according to the first embodiment.

In FIG. 15, there is shown a step response in accordance with this embodiment when parameters (A and R) of a prediction model is actually deviated by 20%. A characteristic of a controlled object is the same as the case shown in FIG. 12. As apparent from comparisons between FIG. 15 and FIG. 12, even when the parameters employed in the prediction value calculating unit are not so precise, the better control characteristic can be obtained.

While the fluid surface control of the tank has been described in the above-described embodiment, the present invention is not limited thereto, but may be widely applied to such a case that a future output of a controlled object may be predicted to some extent. For instance, a flow rate control for a fluid (including not only a gas, but also a solid) flowing through a pipe, and a temperature control for a temperature bath. In case of the flow rate control, the manipulating variable (u) corresponds to a valve opening degree, and the controlled variable corresponds to a flow rate, and further a transfer function is expressed in a form of Equation (7).

$$y(s) = u(s) \cdot k \cdot exp(-Ls)/(1+Ts) \quad \ldots (7)$$

where symbol "K" is a gain, symbol exp(-Ls) denotes dead time of "L", and symbol (1+Ts) represents a first order lag of a time constant T. This equation has a similar form to the above-explained Equation (4), which indicates that the present invention may be applied thereto. Also in case of the temperature control, a relationship between the manipulating variable (heater power of electric furnace) and the controlled variable (temperature) is expressed by the Equation (7), which indicates that the present invention may be applied thereto. Although the controlled object of the above-described example is continued, it is apparent that the present invention may be applied also to a controlled object in a discrete system.

The above-described case is such a case that the controlled object can be approximated to the dead time and the first order lag. A description will now be made of such a case that a controlled object can be approximated to the dead time and the second order lag in accordance with a second embodiment. A transfer characteristic under such a condition that the controlled object can be approximated to the dead time and the second order delay, is expressed by the Equation (7).

$$Y(s) = X(s) \cdot K \cdot exp(-Ls)/(1+T_1 s + T_2 s^2) \quad \ldots (8)$$

where symbol Y(s) indicates a Laplace transform of a controlled variable; symbol X(s) denotes a Laplace transform of a manipulating variable; symbol K is a gain of a controlled object; symbol L shows dead time; symbol $T_1$ denotes a time constant of a primary term; and symbol $T_2$ shows a time constant of a secondary term. Based on this Equation (8), assuming now that the manipulating variable is continued, the controlled variable after a predetermined time has passed is predicted. Accordingly, the manipulating variable can be determined in a similar manner to that of the above-described first order lag.

Figure 16:
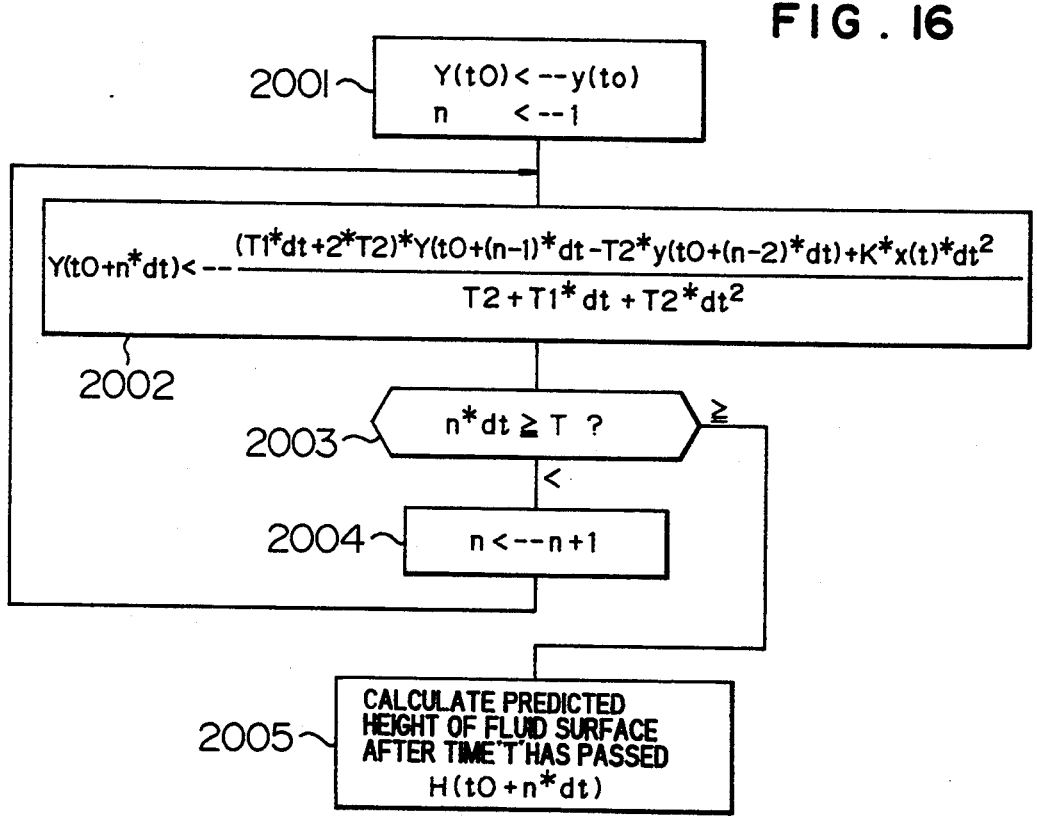
FIG. 16 is a flow chart for showing a process step of a prediction calculation about a tank fluid surface control according to a second embodiment of the present invention.
Figure 17:
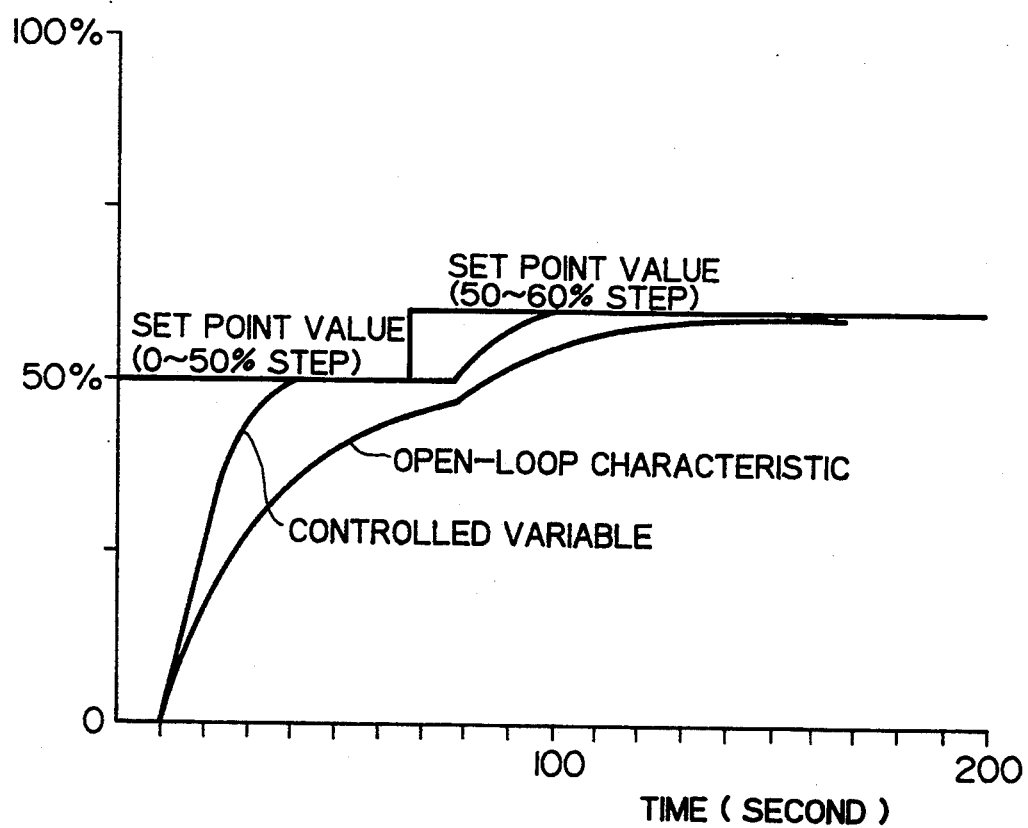
FIG. 17 is a characteristic diagram for indicating a control result obtained in accordance with the second embodiment.

FIG. 16 represents a process flow of a prediction calculation according to this second embodiment. The Equation (8) is transformed into a difference equation defined at a step 2002. FIG. 17 represents a controlled result when the characteristic parameters are defined by $K=1$, $L=10$ seconds, $T_2=5$ seconds, and $T_1=25$ seconds. As a consequence, it can be seen that the open loop characteristic could be improved.

Figure 18A:
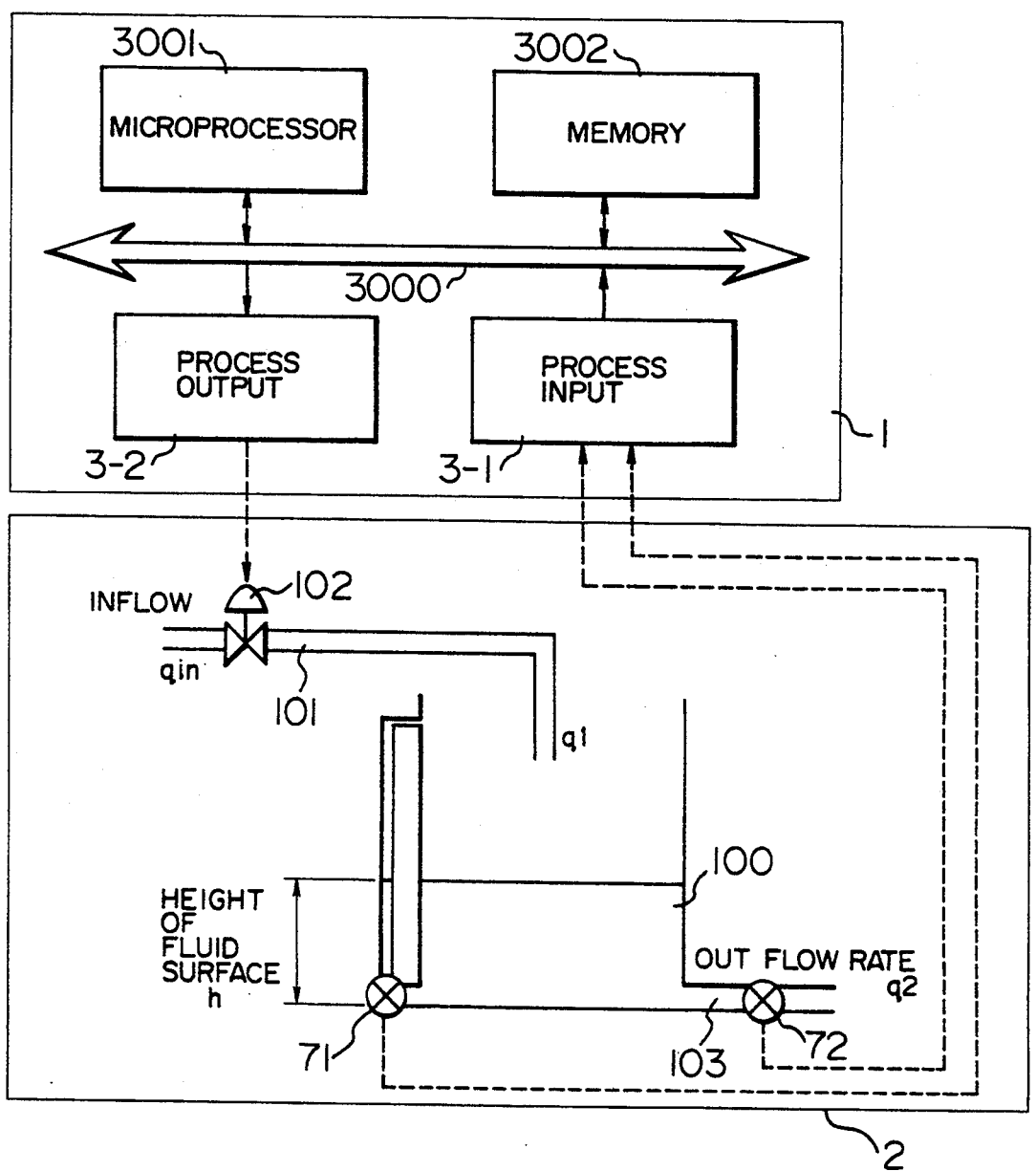
FIGS. 18A, 18B and 18C are block diagrams showing examples of systems implementing the present inventions, respectively.
Figure 18B:
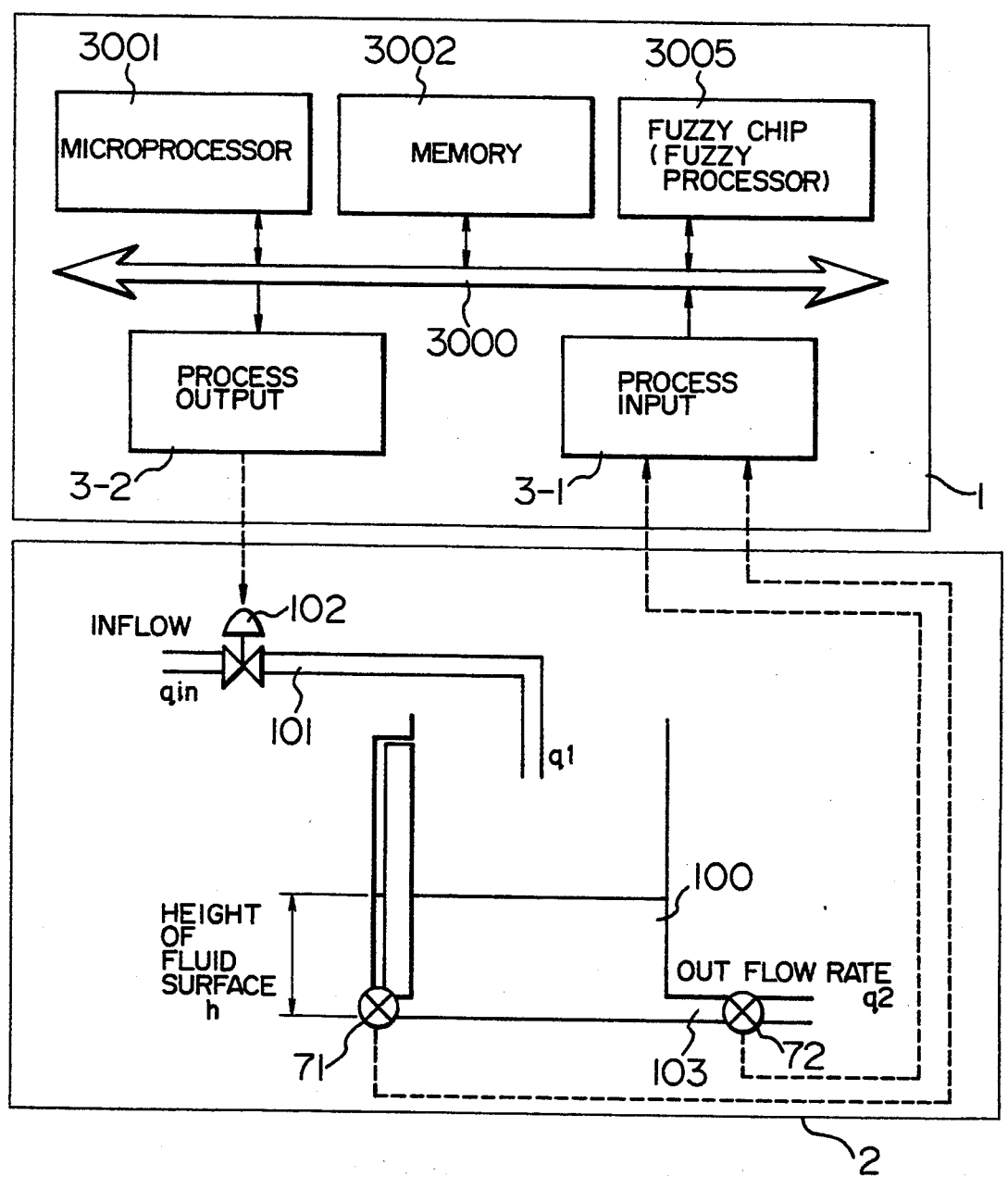
Figure 18C:
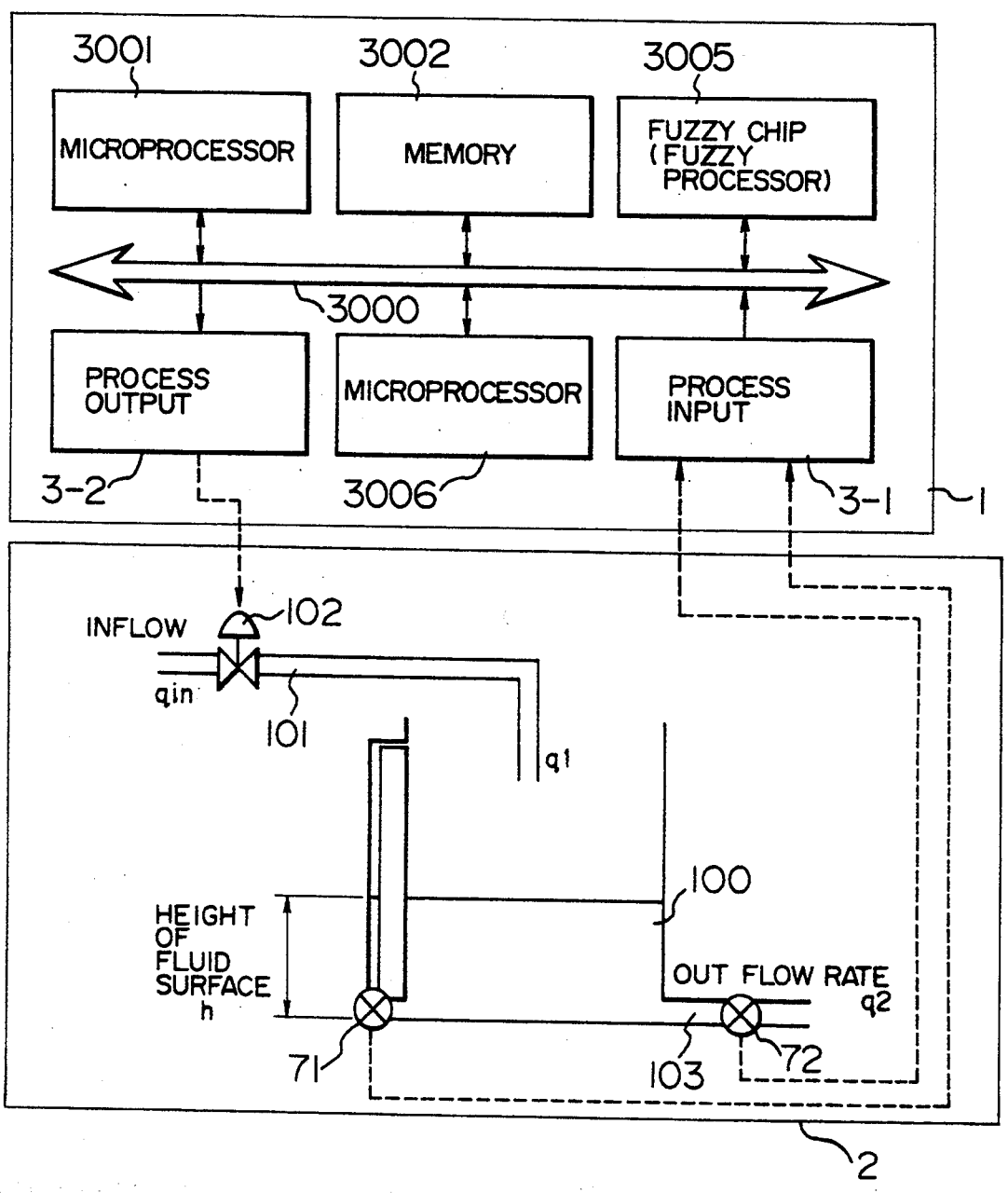

FIGS. 18A to 18C show arrrangements of apparatus implementing the present invention by way of example, respectively.

In the example of FIG. 18A, a control unit 1 include a bus line 3000, a microprocessor 3001, a memory 3002, an input device 3-1 and an output device 3-2. A controlled object 2 includes a sensor 71 for measuring the height h of fluid surface and a sensor 72 for measuring the outflow rate $q_2$ of the liquid. The arrangement of FIG. 18A is suitable for implementing the process controls 10 to 12 which are described above with reference to FIG. 1 in a software manner.

The example of FIG. 18B is modified from that of FIG. 18A in that a control unit 1 of FIG. 18B includes a bus line 3000, a microprocessor 3001, a memory 3002, an input device 3-1, an output device 3-2 and a fuzzy processor (fuzzy chip) 3005. Fuzzy operations in the control unit 1 which are performed in the block 11 of FIG. 1 can be implemented with a hardware configuration, thereby providing high-speed control. The prediction operations are performed by the microprocessor 3001. The microprocessor 3001 may be typically of MC68040 sold by Motorola in U.S.A. The fuzzy processor 3005 may be typically of FC110 sold by Togai Infrahogic, Inc.

The example of FIG. 18C is modified from that of FIG. 18B in that the control unit 1 in the FIG. 18C arrangement additionally includes a microprocessor 3.006 which performs prediction as indicated in block 12 of FIG. 1, FIG. 4 and FIG. 16, permitting high-speed control so much.

Although the above-described embodiments have been made of the primary delay system and the secondary delay system, the present invention may be similarly applied to systems higher than a third delay system.

In the above-explained embodiments, the total number of fuzzy rules could be reduced by utilizing only the predicted values of the controlled errors as the input values to the fuzzy inference means. However, when there is no problem even if the total number of fuzzy rules is increased, both of the predicted value of the controlled error and the variation in the predicted values may be employed as two input values to the fuzzy inference means.

In accordance with the present invention, the fuzzy inference can be executed at high speed and can be controlled in real time by utilizing only the predicted value of the control variable as the input value to the fuzzy controlling means. Further, the process control method with high control precision can be provided due to improvements in preventing of noise.

Also, in accordance with the present invention, since the rules and the membership functions for the fuzzy controlling means can be reduced, man power required to build the fuzzy inference system can be considerably reduced, and also the process controlling apparatus capable of readily being adjustable in the actual field work can be provided.

What is claimed is:

1. A process control method for controlling a controlled object in such a manner that a deviation value of a controlled variable from a set point value is reduced, comprising steps of:

predicting an output of the controlled object indicative of the controlled variable after a predetermined time has passed, assuming that an input of the controlled object indicative of a manipulating variable maintains a current value;

inputting only a deviation between a predicted value of said controlled variable and said set point value to a fuzzy reasoning unit; and determining, based on the input deviation, a manipulating variable at a current time for the controlled object by fuzzy inference in said fuzzy reasoning unit; and using the manipulating variable to control the object.

2. A process control method as claimed in claim 1, wherein said predicted value is obtained by approximating the controlled object to a first order delay.

3. A process control method as claimed in claim 1, wherein said predicted value is obtained by approximating the controlled object to dead time and a first order delay.

4. A process control method as claimed in claim 3, wherein said predetermined time is given as a value obtained by multiplying said dead time by an integer.

5. A process control method according to claim 4, further comprising a step of changing the value of said predetermined time to tune a process controller.

6. A process control method as claimed in claim 1, wherein said fuzzy inference is performed by inputting said deviation, which can vary with time, to the fuzzy reasoning unit.

7. A method for controlling a fluid surface of a tank where an inflow rate is adjusted by controlling a control valve, comprising steps of:
predicting a fluid surface of the tank after a predetermined time has passed, assuming that an inflow rate at a current time is maintained, by approximating the tank fluid surface at the current time to a first order delay;
inputting only a deviation value between said predicted fluid surface and a set point value to a set of fuzzy rules in a fuzzy reasoning unit;
performing addition of fuzzy numbers which are outputs of the set of fuzzy rules to said input deviation value;
de-fuzzying a result of Said addition to determine a defuzzyed value as the inflow rate at the current time; and using the defuzzyed value to control the valve.

8. A method for controlling a temperature of a bath where a heater is used as a radiation source, comprising steps of:
determining a predicted temperature of the bath after a predetermined time has passed, assuming that a heater current is continued, by approximating the temperature at the current time to a first order delay;
inputting only a deviation between said predicted temperature of the bath and a set point value to a set of fuzzy rules;
fuzzy adding fuzzy numbers which are outputs of said set of fuzzy rules to said input deviation; and
de-fuzzying a result of said fuzzy adding to determine a de-fuzzyed value as the heater current at the current time.

9. A method for controlling a flow rate of a fluid within a pipe, comprising steps of:
determining a predicted out-flow rate within the pipe after a predetermined time has passed, assuming that an outflow rate at a current time is maintained, by approximating the outflow rate within the pipe at the current time to a first order delay;
inputting only a deviation between said predicted outflow rate within the pipe and a set point value to a set of fuzzy rules;
fuzzy adding fuzzy numbers which are outputs of said set of fuzzy rules to said input deviation; and de-fuzzying a result of said fuzzy adding to determine a de-fuzzyed value as the outflow rate within the pipe at the current time; and using the defuzzyed value to control the flow in the pipe.

10. A process control apparatus for determining a manipulating variable of a control effector for a controlled object, comprising:
predicting means including a simulator approximating the controlled object and determining a predicted controlled variable of the controlled object after a predetermined time has passed, assuming that a current value of the manipulating variable is maintained; and
fuzzy control means responsive only to a deviation between a set point value and the predicted controlled variable of said predicting means for determining the manipulating varible at the current time by fuzzy interference; and using the manipulating variable to control the effector.

11. A process control apparatus as claimed in claim 10, wherein said simulator approximates the controlled object to a first order delay.

12. A process control apparatus as claimed in claim 10, wherein said simulator executes approximating the controlled object to dead time and a first order delay.

13. A process control apparatus as claimed in claim 12, wherein said predetermined time is given as a value obtained by multiplying said dead time by an integer.

14. A process control apparatus according to claim 13, further comprising a step of changing the value of said integer to verify an effect of the process control.

15. A process control apparatus as claimed in claim 10, wherein said simulator performs approximating the controlled object to a second order delay.

16. A process control apparatus as claimed in claim 10, wherein said simulator performs approximating the controlled object to dead time and a second order delay.

17. A process control system for determining a manipulating variable of a control effector of a controlled object by way of fuzzy inference, comprising:
input/output means for inputting a present value of a controlled variable and for outputting the determined manipulating variable of the control effector;
prediction calculating means having a simulator of the controlled object, for calculating a controlled variable after a predetermined time has passed, assuming now that a present value of the manipulating variable is continued;
deviation value calculating means for calculating a deviation value between a predicted value of the controlled variable outputted from said prediction calculating means and a preset set-point value; and
fuzzy controlling means for inferring a manipulating variable at a present time responsive to said deviation value from said deviation value calculating means, and for supplying the inferred manipulating variable to said input/output means.

18. A process control system as claimed in claim 17, wherein said fuzzy controlling means includes:
a plurality of conditional part calculating means for outputting grades corresponding to inputs based upon a plurality of membership functions constituting a fuzzy rule and a conditional part;
a plurality of conclusion part calculating means for producing output membership functions; and
unfuzzy processing means for calculating areal gravity of said plurality of output membership functions from said conclusion part calculating means.

* * * * *

UNITED STATES PATENT AND TRADEMARK OFFICE
CERTIFICATE OF CORRECTION

PATENT NO. : 5,410,470
DATED : 25 April 1995
INVENTOR(S) : Hiromasa YAMAOKE et al.

Page 1 of 2

It is certified that error appears in the above-identified patent and that said Letters Patent is hereby corrected as shown below:

| Column | Line | |
|---|---|---|
| 1 | 62 | Change "values" to --value--. |
| 2 | 50 | Change "mately" to --mating--. |
| 2 | 56 | Change "aspect" to --embodiment--. |
| 3 | 59 | Change "tions" to --tion--. |
| 5 | 12 | After "Qin(s)" change "." to -- • --. |
| 7 | 4 | Change "is undergone" to --undergoes--. |
| 7 | 7 | Change "rule" to --rules--. |
| 8 | 39 | After "value" insert --,--. |
| 8 | 56 | Change "irrelevant to" to --regardless of-- |
| 9 | 11 | Change "unit" to --units--. |
| 9 | 37 | Change "α, β, y, δ" to --α, β, γ, δ--. |

UNITED STATES PATENT AND TRADEMARK OFFICE
CERTIFICATE OF CORRECTION

PATENT NO. : 5,410,470
DATED : 25 April 1995
INVENTOR(S) : Hiromasa YAMAOKA et al.

It is certified that error appears in the above-identified patent and that said Letters Patent is hereby corrected as shown below:

| Column | Line | |
|---|---|---|
| 10 | 67 | Change "is" to --are--. |
| 11 | 20 | After "u(s)" change "." to -- • --. |
| 11 | 46 | After "X(s)" change "." to -- • --. |
| 12 | 4 | Change "include" to --includes--. |
| 12 | 25 | Change "frahogic" to --fralogic--. |
| 12 | 29 | Change "3.006" to --3006--. |
| 12 | 31 | Change "so much" to --to a high degree--. |
| 12 | 51 | Change "preventing" to --prevention--. |
| 13 | 38 | Change "Said" to --said--. |
| 13 | 61 | Change "outflow" to --inflow--. |
| 14 | 17 | Change "interference" to --inference--. |

Signed and Sealed this

Twenty-sixth Day of March, 1996

Attest:

BRUCE LEHMAN

*Attesting Officer*   *Commissioner of Patents and Trademarks*